United States Patent [19]
Lehmkuhl

[11] 3,723,016
[45] Mar. 27, 1973

[54] SPINDLE DEPTH CONTROL

[75] Inventor: Robert A. Lehmkuhl, Cincinnati, Ohio

[73] Assignee: The Carlton Machine Tool Company, Cincinnati, Ohio

[22] Filed: Feb. 17, 1971

[21] Appl. No.: 116,154

[52] U.S. Cl. ..........................408/3, 408/129, 408/9, 408/11
[51] Int. Cl. ..............................................B23b 47/18
[58] Field of Search................408/3, 8, 11, 133, 134

[56] References Cited

UNITED STATES PATENTS

| | | |
|---|---|---|
| 3,492,467 | 1/1970 | Caban et al. ............................408/3 |
| 3,475,997 | 11/1969 | Wohlfeil...................................408/8 |
| 3,151,505 | 10/1964 | Reichert et al. ..........................408/3 |
| 3,021,464 | 2/1962 | Philip .......................................408/3 |

*Primary Examiner*—Francis S. Husar
*Attorney*—Edward J. Utz

[57] ABSTRACT

A horizontal boring machine of the type having a traversing spindle and utilizing fluid motor means for driving the spindle with a tool to a cutting position then moving the tool into the workpiece to a preselected depth with electrical means actuated when said preset depth has been reached to cause a change in the flow of oil in the fluid motor to retract the spindle.

2 Claims, 4 Drawing Figures

PATENTED MAR 27 1973

3,723,016

INVENTOR.
Robert A. Lehmkuhl

BY *Edward Feltz*

ATTORNEY

INVENTOR.
Robert A. Lehmkuhl

SPINDLE DEPTH CONTROL

My invention relates to a spindle depth control device such as is used with machine tools of the class having a spindle for carrying a tool. In drilling and boring machines such as the type known in the art as drills and boring mills, it is desirable to move the spindle carrying the tool to an operative position. It is also desirable in modern day practice to move the spindle carrying the tool to its operative position in the minimum amount of time. In drills and boring mills of the type which I have just described, it is also necessary to determine the distance into the work which the tool will penetrate once this sensing device which forms the basis of my invention becomes operative. It is also desirable to predetermine the depth of the penetration of the tool into the workpiece and such predetermined depth will be constant for continuous operation regardless of the position of the workpiece with reference to the tool. In other words, the surface of the workpiece with reference to the position of the spindle carrying structure and with reference to the depth to which the tool will penetrate the workpiece need not be fixed. In order to accomplish an automatic setting of the depth of the cut without reference to the distance between the tool carrying member in its retracted or inoperative position and the workpiece, I have devised a structure which eliminates the necessity of a predetermined measurable distance between the workpiece and the tool in its inoperative position, and which only requires that a setting be placed in the machine to predetermine the depth to which the tool will penetrate the workpiece, measured from the surface of the workpiece.

Therefore, the tool, by using my invention, will automatically drill or tap to a predetermined depth from the surface of the workpiece after contact with the workpiece.

With my invention, it is desirable that the traverse of the spindle from its inoperative or retracted position of the workpiece be made at the maximum possible speed permitted by the strength of the tool taking into account the effect of the impact of the tool on the work at its traverse rate.

In a drilling operation, positive power feed to the spindle is immediately engaged when the tool contacts the workpiece. This advances the spindle at a fixed but selectable feed rate. In a tapping operation an extremely large number of positive feed rates would be required to tap the variety of sizes that would be expected to be done on a machine of this type. Therefore, a system for tapping that does not require positive feed rates has been incorporated in my invention.

With reference to predetermined settings of the depth of the feed in a machine tool of the class which we have described, it is only necessary in my machine to make one setting for any given feed depth, regardless of the position of the surface of the workpiece with reference to the spindle carrying member.

In general, in my invention I employ a fluid motor or a direct hydraulic spindle driving mechanism, which drives a rack pinion through a gear train. This rack pinion drives or traverses a spindle mounted in the head or tool carrying portion of the machine.

The fluid motor is geared directly to the spindle. The flow of oil through the fluid motor will cease when the spindle stops, causing a drop in pressure in a portion of the system which will cause the pressure switch to become operative to perform electrical sensing functions to be described below. The electrical signal which is the result of the operation just described has several functions, depending whether we are in a drilling or tapping mode. In a drilling mode it disengages the fluid motor drive or other hydraulic drive; secondly, it engages the feed drive, and thirdly, it signals a feed measuring device so that the tool feeds to the proper depth. In a tapping mode it starts the spindle rotation, secondly, it sequences the hydraulic circuit in order to have the hydraulic traverse pressure maintained for a short period of time until the tap is engaged into the workpiece and then the pressure is automatically reduced to provide sufficient force to overcome the frictional force of the sliding spindle with respect to its supporting members, thirdly, it signals a feed measuring device so that the tool feeds to the proper depth.

The feed clutch provided on this type of machinery is hydraulically engaged, and the feed measuring device revolves until a predetermined feed depth is reached to end the feed penetration, and then the spindle is retracted to its starting position.

I have further provided in my invention for a disengagement of the worm clutch to initiate a time cycle to allow for spindle dwell. Dwelling is the process in drilling and boring operation whereby the tool is permitted to remain in its final depth position for a period of time while rotation continues, to permit the squaring out of the hole. When the tool reaches the maximum of its penetration as determined by the measuring device, an electrical signal operates a series of hydraulic valves which disengage the feed clutch and allows fluid to move through the fluid motor to cause the fluid motor to move in a direction opposite that previously described to cause the spindle to be moved to its retracted position. This is known as rapid retraction of the spindle, or the rapid retraction phase of the work cycle. Normally, in my invention, the cycles can be repeated indefinitely by using positional control devices so that the spindle is moved laterally to a new position and then through cooperation with the measuring device is programmed to predetermine a depth position by means of tape or other preselect means, the cycle is repeated and the same depth or other depths of the tool may be accomplished.

The principal object of my invention, therefore is to provide for the drilling or tapping of holes in workpieces, without employment of an operator to operate the machine, by having a device which may be automatically positioned and which will automatically drill or tap a hole to a predetermined depth, regardless of the position of the workpiece with relation to the spindle carrying tool and in a minimum of time.

Another object of my invention is to provide a device which employs hydraulic pressure or fluid motors whereby when a certain pressure switch or pressure sensing device which is sensitive to the cessation of movement of fluid within the system causes certain electrical signals to activate clutches and other mechanisms to become engaged or disengaged to perform the operations for which this machine is intended. It is to be noted that these pressure sensing devices and pressure sensing gauges are automatically predeterminedably settable so that an operator is not required for efficient operation of this device.

Another object of my invention is to provide for a time sequential disengagement of a pair of clutch members utilizing a time delay relay to cause one clutch and then the other clutch to become disengaged. The difference in the time between the disengagements of the two clutches is equal to the time of the dwell.

Another object of my invention is to provide for automatic means of feed engagement which become operable when the tool engages the surface of the workpiece so that the measuring of depth of cut is made from this surface, thus insuring accuracy in depth.

Another object of my invention is to provide an automatic means of engaging feed the instant that the tool strikes the surface of the workpiece, not at fixed distance away from this surface, as is common in other automatically cycling machines, thus insuring the minimum possible time cycle for a given machining operation.

Another object of my invention is to provide for the movement of the spindle from its reference or retracted position to the workpiece at the maximum possible speed commensurate with the stability and strength of the tool along with its size. This is accomplished by the utilization of adjustable valve mechanism whereby the flow of the fluid to or from the fluid motor may be adjusted to account for these conditions.

Another object of my invention is provision of a tapping system which does not require positive feed rates for tapping operations but permits the tap to determine the spindle feed rate.

A further object is to provide a pressure to the hydraulic motor to balance the frictional forces of the sliding spindle with respect to its supporting members during a tapping operation.

Another object of my invention is to preload the feed train mechanism to eliminate any backlash in the system to obtain smoother boring and more accurate depth control.

Other objects and objects relating to details of construction and economies of operation will definitely appear from the detailed description to follow. In one instance I have accomplished the objects of my invention by the devices and means set forth in detail in the following specifications. My invention is clearly defined and pointed out in the appended claims and structures which are useful in carrying out my invention are illustrated in the accompanying drawings. It is to be understood, however, that the devices and structures shown in the drawings which accompany this application for a patent are not limited, but that substitutes in the electrical and hydraulic art may be made and are within the contemplation of my invention.

In the drawings the same reference numerals refer to the same parts throughout the several views, and the sectional view is taken looking in the direction of the arrows at the ends of the section lines.

My invention involves a traversing spindle with a tool carried in said spindle adapted to perform drilling and tapping operations. This invention accomplishes the ultimate object automatically and without the interference of or employment of manual operations and is intended to be completely automatic in its function. The motivating force for the machinery described in my invention in this particular case is hydraulic fluid. The hydraulic fluid is caused to act in response to electrical signals which are set in motion by various control devices well known in the art and variously described as numerical or electronic control mechanisms. This encompasses tape control as well as electronic tube control or other means of activating the hydraulic fluid in this machine to perform its desired functions. The tool performs its function in the art by drilling, tapping or boring into workpieces. This drilling and tapping must be to preselected depths for various sized holes located at various lateral positions and at varying distances from the reference point. Means are provided for moving the spindle which carries the tool to the workpiece by utilizing hydraulic fluid in combination with a fluid motor, or by using other hydraulic means to cause the spindle to traverse to a cutting or working position in the shortest possible time, and then by causing the tool in the spindle to penetrate into the workpiece to an automatically preselected depth, and then if it is desired, to permit the tool to dwell for a predetermined time at the maximum point of its penetration, and then to return to its reference or retracted position. The return of the tool to its retracted position is accomplished by reversing the direction of oil flow through the fluid motor in response to an electrical signal produced when the preset depth has been reached.

There is a tapping system which does not require positive feed rates for tapping operations but permits the tap to determine the spindle feed rate. The pressure to the hydraulic motor balances the frictional force to the sliding spindle during a tapping operation.

During a boring operation, that is when the machine is boring metal with a tool, the feed gears are operative, and at the same time hydraulic pressure is applied to act in the opposite direction against the feed train through an hydraulic motor exerting pressure to traverse gears meshing with the rack pinion. The gear trains are responsive to variations of forces at the cutting point of the tool and these variations are minimized by the forces exerted by the hydraulic motor.

Figure 1:
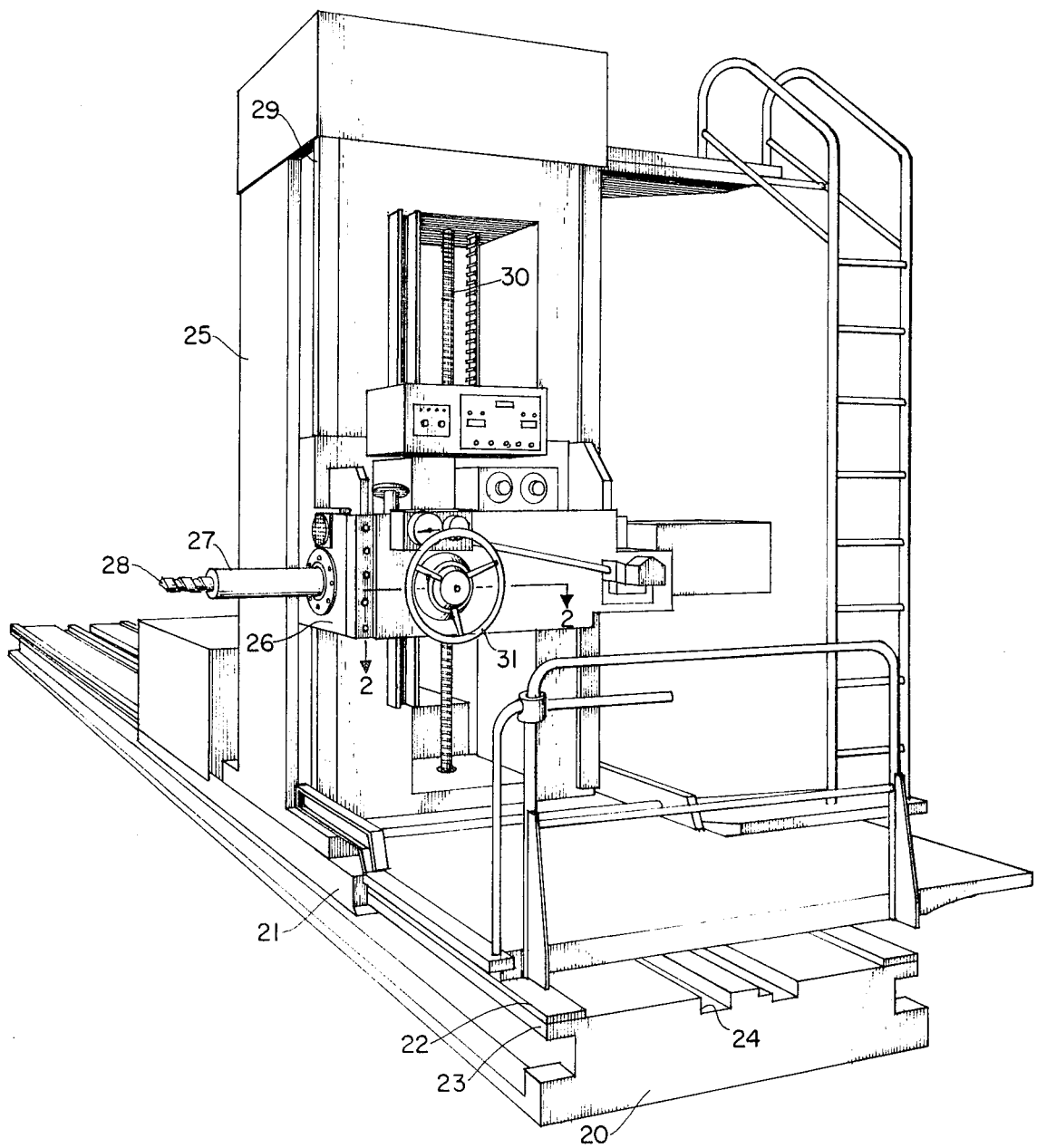
FIG. 1 is view in perspective of a horizontal boring machine.

Referring to the numbered parts of the drawings, reference is made to FIG. 1 in which I show a typical horizontal boring mill having a base 20. The base 20 has a saddle 21 which is adapted to slide on ways 22 and is guided along surfaces 23 and 24. The saddle supports a column 25 on which is mounted a head 26, which carries a spindle 27 for securing an operating tool such as 28. The head 26 is movable vertically on ways 29 on the column 25, by means of screw 30. The spindle 27 may be manually operated by traverse wheel 31.

Figure 2:
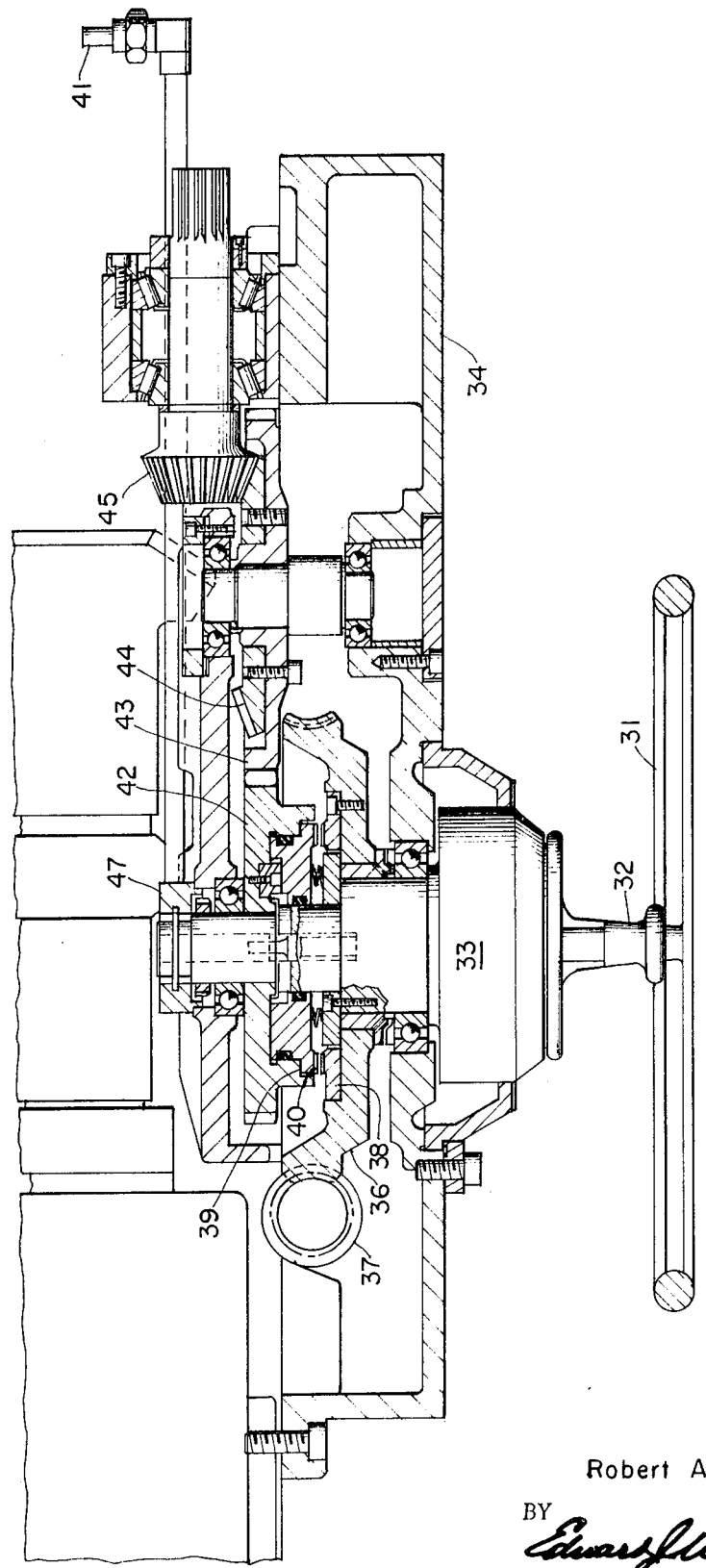
FIG. 2 is detailed sectional view taken along the lines 2—2 of FIG. 1.

Referring to FIG. 2, traverse wheel 31 is bolted through 32 to a quick return mechanism 33 to be described. I provide a quick return mechanism having a body 34 within which is carried a worm 37 which meshes with worm wheel 36. Secured to worm wheel 36 is quick return clutch jaw 38, slidable clutch jaw 39 is provided with serrations 40 which mate with serrations on clutch jaw 38. Clutch jaw 39 slides within gear 42 and is actuated by hydraulic pressure entering the system through port 41. The slidable clutch jaw 39 is keyed to gear 42 which in turn meshes with gear 43 driving a spiral bevel gears 44 and 45.

Figure 3:
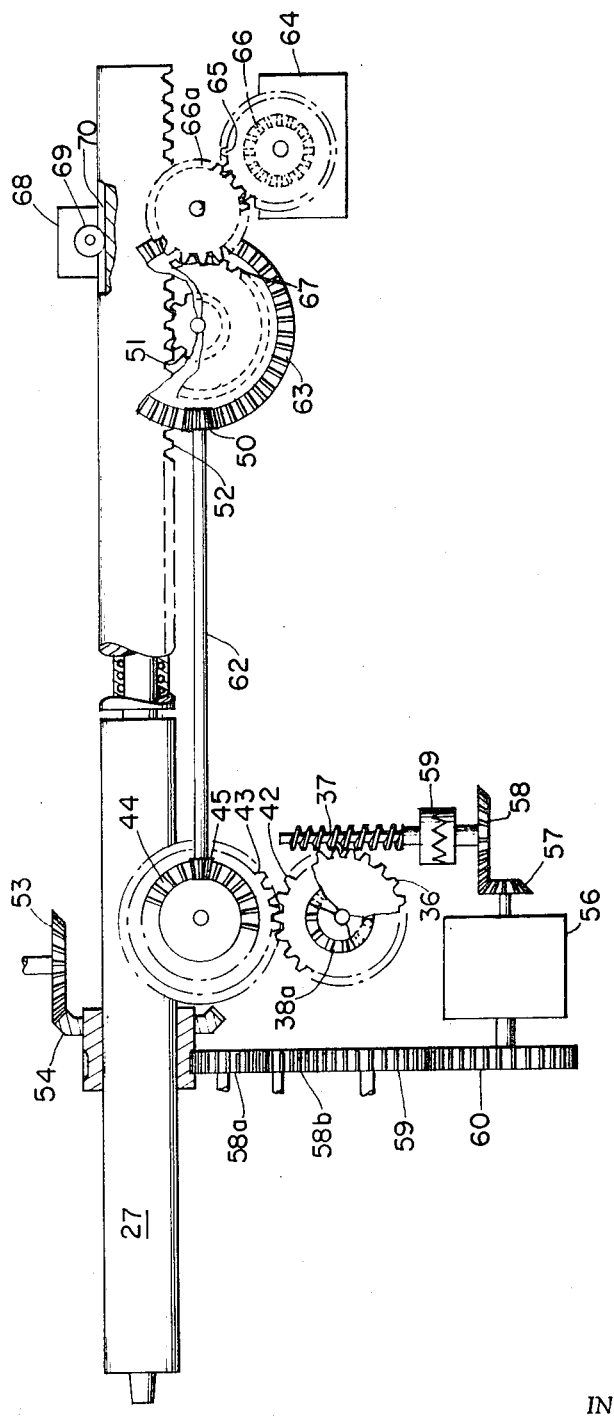
FIG. 3 is a schematic drawing of the spindle the feed train, the traversing mechanism and measuring device.

Referring to FIG. 3, gear 45 mechanically connected with a jack shaft and pinion arrangement 50 to a spindle rack pinion 51 which feeds or traverses the spindle 27 by moving of rack 52. In FIG. 3, I show the spindle driving gear 53 and spindle driven gear 54, actuated by a typical spindle driving gear mechanism well known in the art. In operation, rotation of spindle gear 54 rotates multiple feed gears in feed box 56 through feed gears 58a, 58b, 59 and 60. 56 is a typical multi-feed gear box whose out-put shaft drives bevel gears 57 and 58, bevel gear 58 drives worm 37 through dwell clutch 59. Feed worm 37 drives feed worm wheel 36 which in turn drives gear 42 through quick return clutch indicated at 38a. Gear 42 drives gear 43 which in turn drives bevel gears 44 and 45. The jack shaft 62 attached to bevel gear 45 rotates bevel gear 50 which drives rack pinion 51 through bevel gear 63. Rack pinion gear 51 feeds spindle 27 through rack 52, according to the feed rate selected in the feed gear box mechanism 56. For rapid traversing of the spindle, hydraulic motor 64 drives gear 65 through an electric clutch 66. Gear 65 drives gear 66a which in turn meshes with 67, which rotates rack pinion 51. An electronic feedback device 68 is rotated by reason of precision pinion 69 meshed with precision rack 70 which is secured to rack 52. The movement of the spindle 27 and the rack 52 is monitored and controlled by the electronic feedback devise 68.

Figure 4:
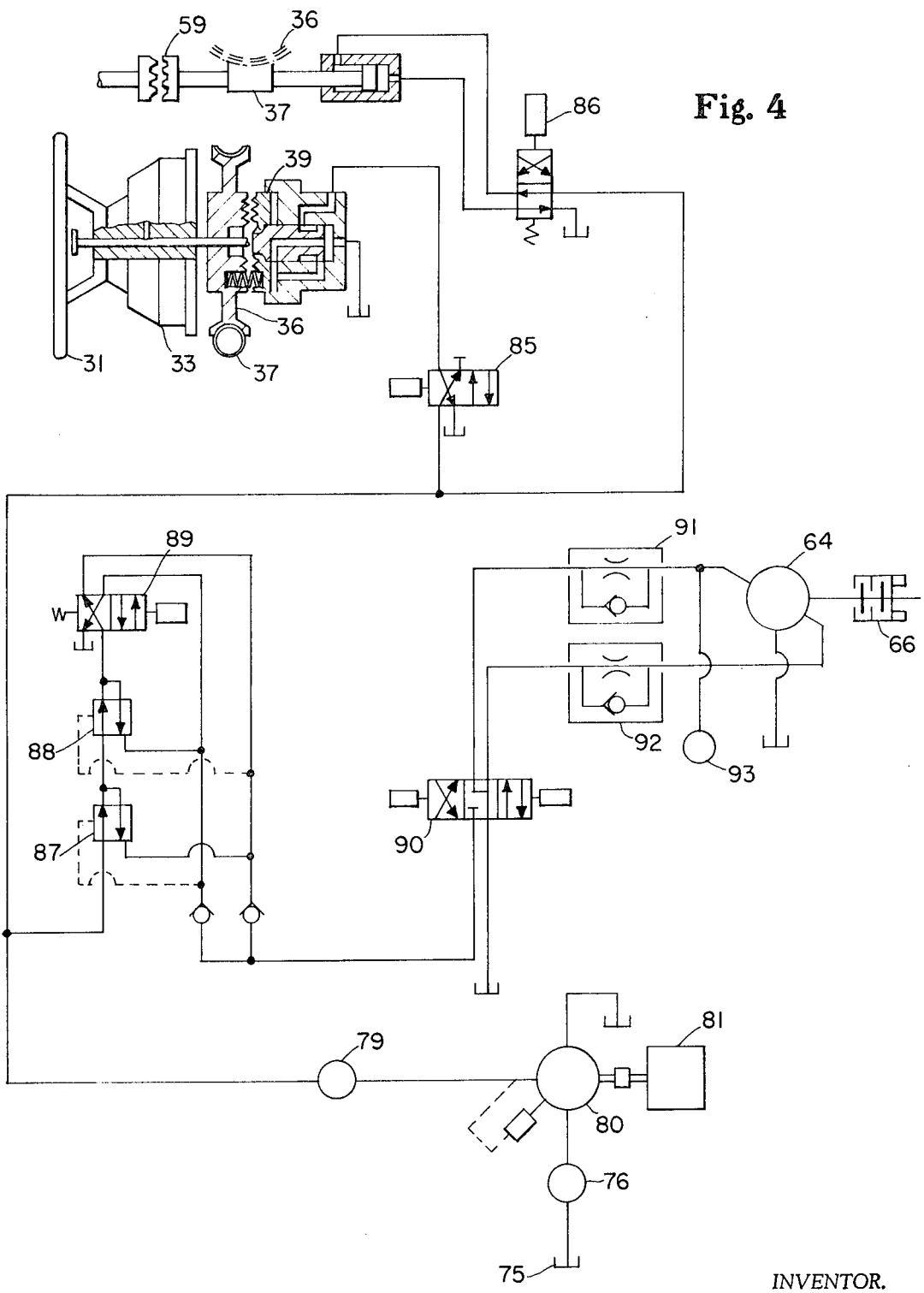
FIG. 4 is a hydraulic diagram of my invention.

Referring to FIG. 4, the hydraulic pump 80 is driven by an electric motor 81. Hydraulic fluid is carried from reservoir 75 through strainer 76 to the hydraulic pump 80, and it is pumped through filter 79. The fluid passing through filter 79 will follow one of two points and will actuate the quick return clutch jaw 39 by means of solenoid valve 85 or the dwell clutch 59 by means of solenoid valve 86, or it will pass through pressure reducing valves 87 and 88 which are selectable by means of solenoid valve 89. The fluid leaving the pressure reducing valve enters a three position solenoid valve 90 and is directed to hydraulic motor 64 through flow control valves 91 and 92, depending upon the position of the three-way solenoid valve 90. Pressure switch 93 senses fluid pressure drop during surface sensing cycle.

In a surface sense drilling operation, clutch 66 is energized and solenoid valve 90 is actuated to direct oil to hydraulic motor 64 which advances spindle 27. During the rapid advance of the spindle, quick return clutch 38a is disengaged. The pressure in the exhaust port of hydraulic motor 64 is determined by the speed of the hydraulic motor and the setting of the flow control valve 91. At the instant the tool contacts the work the hydraulic pressure as seen by pressure switch 93 located in exhaust port of hydraulic motor 64 drops due to the lack of flow in the hydraulic system. This drop in hydraulic pressure actuates pressure switch 93. Upon signal from pressure switch 93, the quick return clutch 38a is actuated by solenoid valve 85, the feed worm clutch 59 is actuated by solenoid valve 86. The electric clutch 66 is disengaged and solenoid valve 90 is de-energized which stops fluid motion to hydraulic motor 64. The same signal from pressure switch 93 also actuates electronic feedback device 68 to start the measuring sequence. The actuation of the above devices will cause the spindle to advance the tool into the workpiece at a rate selected by the gear ratio in the feed box 56. As the tool reaches the preset depth it is measured by feedback device 68. The quick return clutch 38 and feed worm clutch 59 are disengaged by actuation of solenoid valves 85 and 86 respectively. The spindle 27 is then rapid retracted by the engagement of clutch 66 and the actuation of solenoid valve 90 which introduces the flow of oil to hydraulic motor 64. The retract speed is determined by flow control valve 92.

In a boring operation, quick return clutch 38a is disengaged as well as worm feed clutch 59. In order to rapid advance the spindle to the work, we engage electric clutch 66 and actuate solenoid valve 90 which directs oil to hydraulic motor 64. Hydraulic motor 64 causes spindle 27 to rapid advance by means of clutch 66, gears 65, 66a, feed rack pinion 51 and rack 52. During a boring operation the position of the spindle is continuously monitored by the feedback device 68. In boring, the rapid advance distance of the spindle is determined by a dimension preset in the control from an initial position of the spindle. This preset dimension is commonly known as the R-plane. When the spindle 27 reaches the R-plane the control will cause the quick return clutch 38a and feed worm clutch 39 to be engaged by the actuation of solenoid valves 85 and 86 respectively. At the same instant, the direction of actuation of solenoid valve 90 will be reversed to apply hydraulic pressure to the hydraulic traverse motor 64, in a direction opposite to what the spindle is feeding. As the spindle reaches the proper depth as indicated by feedback device 68, the feed worm clutch 59 is disengaged by actuation of solenoid valve 86. The disengagement of feed worm clutch 59 will cause the forward feeding of the spindle to cease, thus causing a dwell condition. After the proper dwell time, the quick return clutch 38a will be disengaged by actuation of solenoid valve 85. Since the electric clutch 66 is already engaged and hydraulic pressure is applied to motor 64 through valve 90, the spindle 27 upon release of quick return clutch 38a, will immediately start to retract in a rapid traverse mode. The spindle will retract to its original point, at which time clutch 66 becomes disengaged and solenoid valve 90 is returned to its neutral position. It should be noted that in all boring operations, the dwell time is not necessary and may be eliminated by the simultaneous disengagement of both dwell clutch 59 and quick return clutch 38a, at the time the spindle reaches the programmed depth as measured by feedback device 68.

In tapping, the quick return clutch 38a is disengaged through the entire tapping cycle. The spindle 27 is advanced from its retracted position by the rotation of hydraulic motor 64, driving gear 65, 66a and rack pinion 51 through the engaged electric clutch 66. The rotation of the rack pinion 51 causes rack 52 to rapid advance spindle 27. As the tap in nonrotating spindle 27 contacts the work, pressure switch 93 is again actuated in a similar manner as in the surface sense drilling operation described above. The actuation of pressure switch 93 actuates solenoid valve 89 which causes pressure reducing valve 88 to reduce the pressure, as seen by hydraulic motor 64, to a level that just balances the frictional forces created by the weight of the horizontal spindle 27 and rack 52 resting on their respective supporting members, thus the only axial force on the tap is that which is necessary to have the tap advance into and retract itself from the hole. The lead of the tap then determines the rate at which the spindle advances. The actuation of pressure switch 93 also causes the spindle 27 to start to rotate as well as signal feedback device 68 to start measuring the depth of the hole from this point. It should be noted here that there is a short time delay before solenoid valve 89 is actually actuated and after the spindle 27 is rotated. This time delay being sufficient to allow the tap to be started into the hole by the higher traverse pressure determined by pressure reducing valve 87. As the tap reaches the proper depth, as measured by feedback device 68, the spindle rotation is reversed and solenoid valve 90 is actuated to change the direction of fluid pressure to hydraulic motor 64. The balancing pressure in the system is maintained until the tap clears the workpiece at which time solenoid valve 89 is again actuated which causes the pressure to be increased to the traverse pressure level. The spindle will then rapid retract to its original starting point where electric clutch 66 will become disengaged and solenoid valve 90 will be actuated such to block the flow of oil to hydraulic motor 64.

I claim:

1. A horizontal boring machine having a head, a column, said head slidably mounted on said column, a traversing spindle within said head, a boring tool carried in said spindle, means for moving the boring tool into the workpiece, comprising a rack connected to said spindle, a hydraulic rapid traverse motor, first clutch means for selectively connecting said traverse motor to said rack, a mechanical feed means, second clutch means for selectively connecting said mechanical feed means to said rack, means for actuating said second clutch means when said said spindle reaches a preselected position, means for preselecting the feed rate, and presettable means for reversing the fluid pressure in the hydraulic motor to counteract the forward movement of the spindle during feeding with the mechanical feed.

2. The device of claim 1 where the means for reversing the fluid pressure in the hydraulic motor at a preselected point comprises a directional valve.

* * * * *